MAGNETIC MEMORY SYSTEM

Filed June 17, 1958 2 Sheets-Sheet 1

INVENTORS
ANTHONY GALOPIN &
JOSEPH L. MEDOFF
BY Morris Rabkin
ATTORNEY

Dec. 18, 1962 A. GALOPIN ETAL 3,069,663
MAGNETIC MEMORY SYSTEM
Filed June 17, 1958 2 Sheets-Sheet 2
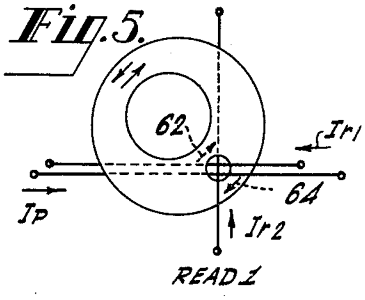
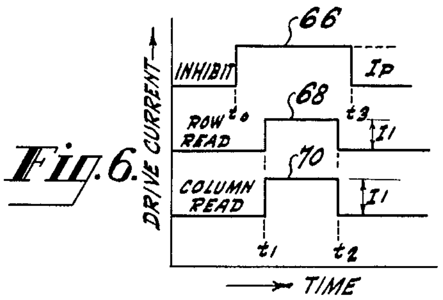
FIG. 5. FIG. 6.
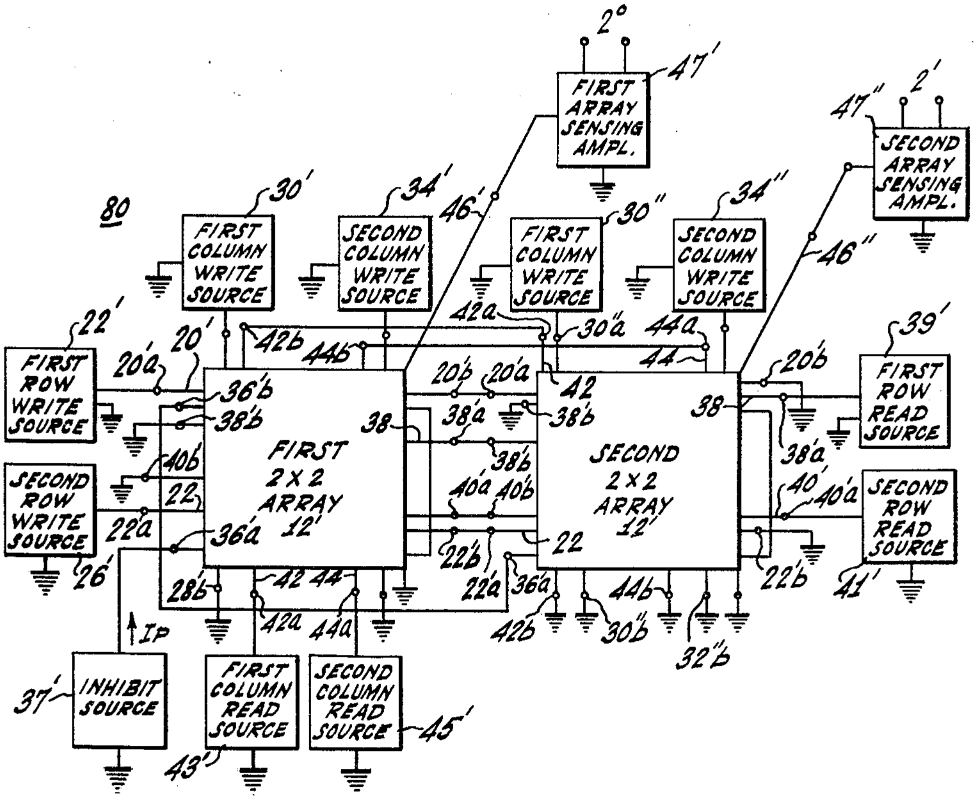
FIG. 7.
INVENTORS
ANTHONY GALOPIN &
JOSEPH L. MEDOFF
BY Morris A. Rabkin
ATTORNEY

3,069,663
MAGNETIC MEMORY SYSTEM

Anthony Galopin, Arlington, and Joseph L. Medoff, Cambridge, Mass., assignors to Radio Corporation of America, a corporation of Delaware Filed June 17, 1958, Ser. No. 742,585
8 Claims. (Cl. 340—174)

This invention relates to a memory system, and in particular to memory systems using magnetic elements.

Memory systems of the coincident-current magnetic type usually employ two or more separate selection signals in selecting a desired memory element. In operation, one or more of the separate selecting signals is arranged to produce an excitation less than the coercive force of any of the memory elements. This excitation is termed in the art a "half-excitation." The selected element, however, receives a net excitation in excess of its coercive force. The excitation received by the selected element is termed a "full-excitation." The speed with which a memory element changes from one of its two states to the other is inversely proportional to the amplitude of the applied excitation. Therefore, it is desirable that excitations as large as possible be used in order to obtain high-speed memory operation.

Various different systems are known in the art for obtaining access to a desired memory element using different combinations of half and full excitation pulses. A problem common to each of these systems is that the half excitation must be carefully regulated in amplitude so that the coercive force of non-selected memory elements is not exceeded. Also, the memory elements must be chosen so that their respective coercive forces lie within a narrow range. A narrow range of coercive forces is required to insure that a given half-excitation does not exceed the coercive force of any of the elements during operation of the memory.

It is an object of the present invention to provide memory systems of the magnetic type using all full-excitation selecting signals for selecting a desired memory element.

Another object of the present invention is to provide improved magnetic memory systems in which memory elements of wider tolerances in their respective coercive forces can be used.

Still another object of the present invention is to provide improved magnetic memory systems which do not require a high degree of regulation of the excitation sources.

A further object of the invention is to provide improved magnetic memory systems in which the stored information can be read out at a higher speed than in certain prior magnetic memory systems of the coincident type.

According to the present invention, each memory element comprises a multi-apertured core of rectangular hysteresis loop magnetic material. A plurality of selection windings are linked exclusively through a corresponding one aperture in each of the elements. A desired element is selected by first applying a full excitation of one polarity to one of these windings linked to all the elements. Two other full excitations, each of the polarity opposite the one polarity, are next applied to two different groups of the elements with the selected element being common to the two different groups. The two other excitations produce sufficient magnetizing force to cancel the opposite polarity magnetizing force and to apply a full excitation to the selected element. All the other elements received either no excitation or a full excitation in the opposite polarity. This opposite polarity full excitation does not produce any appreciable flux change in any of the cores.

In the accompanying drawing:

FIG. 1 is a schematic diagram of a memory system according to the invention;

FIGS. 2 through 5 are each a schematic diagram of one memory element of the system of FIG. 1 and useful in illustrating the operation of the system of FIG. 1;

FIG. 6 is a timing diagram useful in explaining the operation of the system of FIG. 1; and FIG. 7 is a schematic diagram of a memory system in accordance with the invention using a plurality of separate arrays of the multi-apertured magnetic elements.

Figures 1, 2, 3, 4:
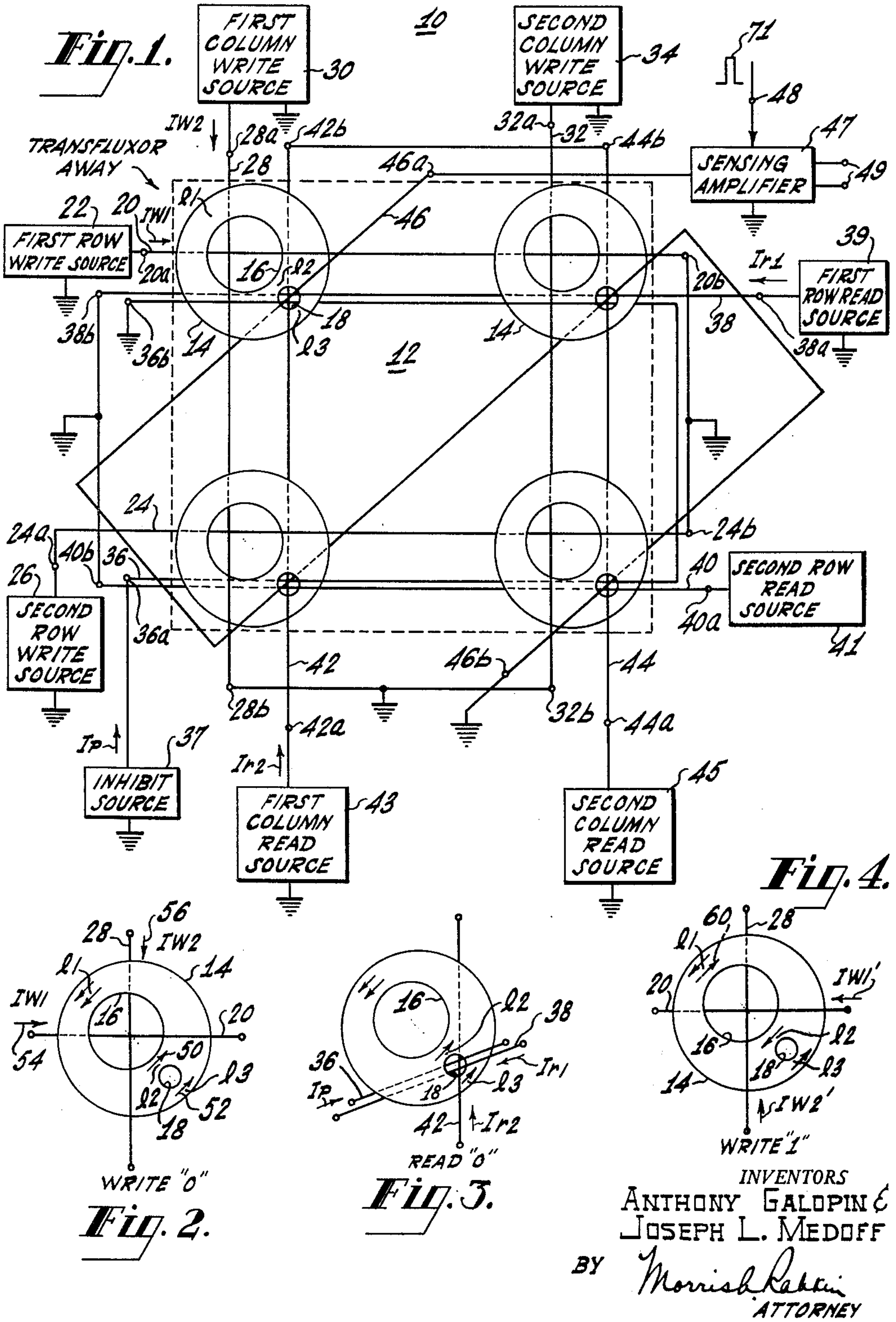

The memory system 10 of FIG. 1 has, for example, a 2 x 2 array 12 of the multi-apertured magnetic elements 14. The array 12, for example, is a square array having two rows and two columns of the elements 14. Each element 14 is a two-apertured core of substantially rectangular hysteresis loop magnetic material. A suitable rectangular loop magnetic material is manganese-magnesium zinc ferrite. Each of the elements, for example, corresponds to a transfluxor core described in an article by J. A. Rajchman and A. W. Lo, entitled "The Transfluxor," published in the March 1956 edition of the Proceedings of IRE. Details of the arrangement and operation of two-apertured transfluxor cores are described in that article. Briefly, each element 14 includes a relatively large diameter setting aperture 16 and a relatively small diameter output aperture 18. The two apertures 16 and 18 of the element 14 provide three separate legs $l_1$, $l_2$ and $l_3$ in the magnetic material. The wide outside leg $l_1$ has a minimum cross-sectional area at least equal to the sum of the cross-sectional areas of the narrow inside leg $l_2$ and the narrow outside leg $l_3$. The two legs $l_2$ and $l_3$ preferably have substantially equal cross-sectional areas. Other arrangements of transfluxor cores are described in the Rajchman and Lo article.

The setting aperture 16 of each memory element 14 is linked by a different pair of write coils, one row write coil and one column write coil. For convenience of drawing, the various coils are shown as single-turn coils. However, it is understood that multi-turn coils may be used if desirable or necessary. The first row write coil 20 has one terminal 20a connected to a first write source 22, and the second row write coil 24 has one terminal 24a connected to a second row write source 26. The other terminals 20b and 24b of the row write coils are connected to a common point of reference potential, indicated in the drawing by the conventional ground symbol. The first column write coil 28 has one terminal 28a connected to a first column write source 30. The second column write coil 32 has one terminal 32a connected to a second column write source 34. The other terminals 28b and 32b of the first and second column write coils 28 and 32 are connected to the common ground. Any one of the write coils links any one of the elements 14 in the same sense, as described more fully hereinafter.

Four separate windings are linked through the output aperture 18 of each of the elements 14. A first of these four coils is an inhibit coil 36 linked to all the elements 14 of the array 12. The inhibit coil 36 is connected at its terminal 36a to a source 37 of inhibit pulses. The inhibit source 37 also may be arranged to supply a steady D.C. (direct current) bias to the inhibit coil 36. In the latter case, the inhibit source may be a conventional battery. The other terminal 36b of the inhibit coil 36 is connected to ground. A second of these four coils is one of the first and second row read coils 38, 40 respectively linking the upper and lower rows of the elements 14. A third of these four coils is one of the first and second column read coils 42 and 44 respectively linking the left and right-hand columns of the array 12. The fourth of these coils is a sensing coil 46 also linked to all the elements 14 of the array 12. The sensing coil 46 is connected at its terminal 46a to a sensing amplifier 47 have a strobe input 48 and a pair of output terminals 49.

Each of the first and second row and column read coils 38, 40 and 42, 44 links any one of the elements 14 in the same one sense. The inhibit coil 36 links any one of the elements 14 in the sense opposite the one sense. The sensing winding 46 preferably links successive ones of the elements 14 in mutually opposite senses. This linkage of the sensing coil 44 corresponds to the so-called "checkerboard" type linkage. Each of the row and column read coils 38, 40 and 42, 44, after linking the array 12 elements 14, has one terminal 38b, 40b, and 42b, 44b connected to the common ground. The inhibit coil 36 and the sensing coil 46 each has one terminal 36b and 46b connected to the common ground. The first and second row read coils 38 and 40 are respectively connected at their terminals 38a and 40a to the outputs of first and second row read sources 39 and 40. The first and second column read coils 42 and 44 are respectively connected at their terminals 42a and 44a to the outputs of first and second column read sources 43 and 45. Each of the various sources used in operating the memory system also has a common ground connection. The various driver sources used herein are well known in the art and are commercially available. Any suitable constant current source may be used for the row or column read and write sources and the inhibit source.

The sensing amplifier 47 also is well known in the art. The sensing amplifier 47 provides an output signal at its output terminals 49 when it is enabled at its input connected to the sensing amplifier 46 and when a strobe signal is applied to its strobe input 48. A relatively large voltage induced in the sensing winding or sensing coil 46 operates to enable the sensing amplifier 47.

The two binary digits "1" and "0" are represented in an element 14 by the two conditions of flux around its output aperture 18. For example, a binary "0" digit may be represented in an element 14 when the flux in both the narrow legs $l_2$ and $l_3$ adjacent to output aperture 18 are in mutually opposite senses that is, the flux in the leg $l_2$ is oriented in the clockwise sense with reference to the output aperture and the flux in the leg $l_3$ is oriented in the counter-clockwise sense with reference to the output aperture. The arrows 50 and 52 of FIG. 2 represent the flux condition in an element 14 when storing a binary "0." The flux is established in the legs $l_2$ and $l_3$ in the mutually opposite senses by applying two currents each of one polarity to the two write coils linked through the write aperture 16 of an element 14. For example, the currents IW1 and IW2 applied to the first row and first column write coils 20 and 28 (FIG. 1) in the direction of the arrows 54 and 56 write a binary "0" digit into the element 14 of the first row and column of the array 12. The arrows 54 and 56 are used to indicate the direction of positive, conventional current flow in a coil, as are the other current indicating arrows referred to hereinafter.

As indicated in FIG. 2, the pair of write currents IW1 and IW2 together change the flux in all portions of the element 14 to the counter-clockwise sense, with reference to the setting aperture 16.

As indicated in FIG. 3, when an element 14 is storing a binary "0" digit, a pair of read currents IR1 and IR2 applied to the first row and first column read coils 38 and 42 do not produce any appreciable flux change in the element 14. No appreciable flux change is produced because the inside narrow leg $l_2$ already is saturated with flux in the direction in which the read currents IR1 and IR2 tend to change flux. Thus, when an element 14 is storing a binary "0," no appreciable flux change is produced and no appreciable signal is induced in the sensing coil 46 of the array 12.

During the read operation, an inhibit current IP is applied to the inhibit coil 36 in a direction to oppose both the read currents IR1 and IR2 in the output aperture 18. The purpose of the inhibit current is to prevent undesired flux changes by the read currents IR1 and IR2 in the array 12, as will be described more fully hereinafter. The amplitude of the inhibit current is made equal to either one of the read currents IR1 and IR2 which are also equal in amplitude. Each of the pair of read currents IR1 and IR2 has an amplitude sufficient to produce a flux reversal in the legs $l_1$ and $l_2$ of any element 14 receiving one of the pair of read currents IR1 and IR2. The inhibit current IP, therefore, does not reduce the net magnetizing force applied to the legs $l_2$ and $l_3$ of the selected element below that required to produced a flux reversal in the legs $l_2$ and $l_3$.

A binary "1" is represented in an element 14 when the flux in both the narrow legs $l_2$ and $l_3$ is in the same one sense, for example, clockwise as indicated in FIG. 4. A binary "1" may be written into a desired element 14, for example, by applying a pair of write currents IW1' and IW2' to the first row and column write coils 20 and 28 linked to the desired element 14. Preferably, the amplitudes of the write currents IW1' and IW2' are limited to produce a net magnetizing force sufficient to change only the flux in the narrow inside leg $l_2$ from the counter-clockwise to the clockwise sense, with respect to the setting aperture 16. A like flux reversal occurs in the wide outer leg $l_1$, as indicated by the dotted arrow 60 of FIG. 4. Accordingly, when an element 14 is storing a binary "1" digit, the pair of read currents IR1 and IR2 now produce a relatively large flux reversal in the legs $l_2$ and $l_3$ from the initial counter-clockwise to the clockwise sense with reference to the output aperture 18. The dotted arrows 62 and 64 of FIG. 5, indicate the flux change produced by the pair of read currents IR1 and IR2 when the element 14 is storing a binary "1" signal. This flux change induces a corresponding large amplitude output signal in the sensing coil 46 of the array 12. Upon termination of the read currents IR1 and IR2, the inhibit current IP changes the flux in the legs $l_2$ and $l_3$ back to the initial counter-clockwise sense with reference to the output aperture 18.

The timing diagram of FIG. 6 illustrates one schedule for the read operation for the memory system of FIG. 1. During a time $t_0$, the inhibit pulse IP designated by the positive pulse 66 of FIG. 6 is applied to the inhibit coil 36. The inhibit pulse 66 of amplitude IP applies a magnetizing force to the legs $l_2$ and $l_3$ of all the elements 14 in a direction to maintain the outside leg $l_3$ in the counter-clockwise sense with reference to the output aperture 18. Thus, referring to FIGS. 2 and 4, the inhibit pulse IP is not in a direction to produce any flux change in an element 14 storing a binary "0" (FIG. 2), or in an element 14 storing a binary "1" (FIG. 4). At a later time $t_1$ the pair of read pulses IR1 and IR2 are initiated, as indicated by the positive pulses 68 and 70 of FIG. 6. Each of the read pulses 68 and 70 is of an amplitude I1 equal to the amplitude IP of the previously applied inhibit pulse 66. When an element 14 is storing a binary "0" the pair of read pulses 68 and 70 do not produce any flux change in the selected element 14 (FIG. 3). When the selected element 14 is storing a binary "1" digit the two read pulses 68 and 70 produce a net magnetizing force to cause a flux reversal in the legs $l_2$ and $l_3$ of that element (FIG. 5). At a later time $t_2$ both the read pulses 68 and 70 are terminated. The inhibit pulse 66 which is continuous until a later time $t_3$ returns the flux in the legs $l_2$ and $l_3$ of the selected element 14 storing a binary "1" to the initial counter-clockwise sense (FIGS. 4 and 5). At time $t_3$, the inhibit pulse 66 is terminated.

Any desired one of the elements 14 may be selected in similar fashion by applying a row read pulse IR1 and a column read pulse IR2 to its row and column read coils. Between the times $t_1$ and $t_2$, a strobe pulse 71 is applied to the strobe input of the sensing amplifier 46. If the sensing amplifier is enabled, the strobe pulse 71 produces an output signal across the output terminals 49. If the sensing amplifier 47 is not enabled, no output is produced. Because the read-out is non-destructive of the previously stored information, as many successive read-outs of the same or different ones of the elements 14 may be carried out, as desired.

As described above, each of the read pulses 68 and 70 of amplitude I1, produces sufficient magnetizing force to change the flux in the legs $l_2$ and $l_3$ from the initial counter-clockwise to the clockwise sense. That is, the read pulses each apply a full excitation to the memory elements 14. Therefore, in the absence of the inhibit current IP, the other elements 14 in the row and column of the desired element would receive sufficient magnetizing force to change flux in the legs $l_2$ and $l_3$ of these "half-selected" elements. However, the inhibit current IP effectively cancels the one row or column read current in the half-selected elements. The remaining non-selected elements 14 receive only the inhibit pulse IP which is not in a direction to change flux in the legs $l_2$ and $l_3$ during the read operation.

Other forms of transfluxors than the two-apertured core illustrated herein may be used. For example, different geometries may be used in locating the three legs $l_1$, $l_2$ and $l_3$ in the element 14 in order to permit still larger read excitations IR1 and IR2 to be applied. However, it is to be understood that even if one of the read excitations IR1 and IR2 were to produce some small flux change in a half selected element 14, the inhibit excitation IP would return such "disturbed" element to its initial condition as soon as the read excitation is ended.

A plurality of the arrays 12 may be interconnected in a larger memory system as indicated for the memory system 80 of FIG. 7. The memory system 80, for example, has a pair of 2 x 2 arrays 12' connected in series with each other. For example, the *b* terminals of the coils of one array 12' may be connected to the *a* terminals of the corresponding coils of the other array 12'. Each of the arrays 12' is arranged in similar manner to the array 12 of FIG. 1. Like elements in the arrays 12 and 12' are designated by like reference numerals with the addition of a prime for those elements of an array 12'. A common inhibit source 37' may be used for applying inhibit pulses IP to the series connected inhibit coils 36'. The two row write sources 22' and 26' also may be common to both the arrays 12' as may be the row read sources 39', 40', and the two column read sources 43' and 45'. Separate first column write sources 30', 30'' and separate second column write sources 34', 34'' are used to write individual binary digits in the separate arrays 12'. A separate one of the sensing windings 46' and 46'' is used for each separate array 12'. The individual sensing windings 46' and 46'' are connected to first and second separate sensing amplifiers 47' and 47''.

The operation of the memory system 80 is similar to that described for the memory system 10 of FIG. 1. During each read operation, the inhibit source 37' is first activated. Activation of one of the row read sources 39' and 40' and one of the column read sources 43' and 45' then operates to select a corresponding memory element in each of the arrays 12'. The selected elements 14 in each of the arrays 12' induces a signal in its separate sensing winding 46' and 46'' corresponding to the information stored in that memory element. New information is written into a selected element 14 of the first array 12' by activating one of the row write sources 22' and 26' and one of the column write sources 30' and 30''. New information is written to the secondary array 12' at the same time by activating one of the column write sources 30'' and 34'' of that array 12''.

Other forms of known multi-dimensional memory systems also may be used within the scope of the present invention.

There have been described herein proved magnetic memory systems which eliminate the need for using half-excitation selecting pulses. No rewrite operation is required since a subsequent inhibit or reset signal returns unconditionally any element of the array to its initial condition. The reset signal may be a pulse signal applied after the read operation or a steady D.C. signal. In the latter case, the pulse driving reset equipment is eliminated. Also in certain applications, the same information is maintained in the memory, as for example, a stored program or a dictionary. In these applications, the write windings and auxiliary equipment can be removed permanently from the memory once the information is loaded.

What is claimed is:

1. In a memory system, the combination comprising a plurality of multi-apertured cores of substantially rectangular hysteresis loop material arrayed in groups for storing binary digits, one binary digit being represented in a core by flux oriented in the same sense, with reference to one aperture, in the portions of material adjacent said one aperture, the other binary digit being represented in a core by flux oriented in opposite senses, with reference to said one aperture, in the said portions of material, means for reading information stored in a desired one of said cores comprising first and second reading lines each linked exclusively through the said one apertures of different said groups of cores and both first and second reading lines being linked exclusively through said one aperture of said desired core, and an inhibit winding linking all said cores exclusively through said one apertures thereof.

2. In a memory system, the combination as claimed in claim 1 including means for applying to said inhibit winding an inhibit signal, said inhibit signal generating sufficient magnetizing force to change the flux in said portions of material in all said cores to said one sense, and means for concurrently applying to said first and second read lines first and second read signals respectively, each said read signal generating sufficient magnetizing force to change the flux in said portions of material from said one sense to the sense opposite said one sense, and both said read signals together generating sufficient magnetizing force to change the flux in said portions of said desired core despite the presence of said inhibiting magnetizing force.

3. In a memory system, the combination as claimed in claim 1 including means for applying a D.C. signal to said inhibit winding, said D.C. signal generating sufficient magnetizing force to change the flux in said portions of any core from said opposite sense to said one sense.

4. In a memory system, the combination as claimed in claim 2, said inhibit signal being terminated after the termination of said read signals.

5. In a memory system, the combination as claimed in claim 2, herein said inhibit signal subsequently returns the flux in said portions of said desired core from said opposite sense to the said one sense.

6. A transfluxor memory system comprising a plurality of transfluxors arrayed in rows and columns, each of said transfluxors having first and second apertures, a plurality of row windings each linked to a different said row of transfluxors exclusively through their said first apertures, a plurality of column windings each linked through a different said column of transfluxors exclusively through their said first apertures, said row and column windings of any one transfluxor linking that transfluxor in the same sense to apply like polarity magnetizing forces to that one transfluxor, an inhibit winding linking all said transfluxors exclusively through said one apertures, said inhibit winding linking any one transfluxor in the sense opposite to the sense of linkage of the row and column windings of that transfluxor, a sensing winding linking all said transfluxors through said one apertures, and separate means for applying magnetizing forces to a selected one of said transfluxors to produce desired flux changes along paths including said second aperture thereof, said desired flux changes corresponding to the writing of desired binary information into said desired transfluxor.

7. In a memory system, the combination comprising a plurality of transfluxors arrayed in rows and columns, each of said transfluxors having first and second apertures, a plurality of row windings each linked to a different said row of transfluxors exclusively through their said first apertures, a plurality of column windings each linked exclusively through a different said column of transfluxors through their said first apertures, said row and column windings of any one transfluxor linking that one transfluxor in the same sense to apply like polarity magnetizing forces to that one transfluxor, an inhibit winding linking all said transfluxors exclusively through said one apertures, said inhibit winding linking any one transfluxor in the sense opposite to the sense of linkage of the row and column windings of that one transfluxor, and a sensing winding linking all said transfluxors through said one apertures.

8. In a memory system, the combination as claimed in claim 7 including means for reading information stored in a desired transfluxor comprising separate means for applying to the said row, column and inhibit windings concurrent signals each sufficient in amplitude to produce a flux reversal in the material adjacent to said one aperture of said desired transfluxor.

References Cited in the file of this patent

UNITED STATES PATENTS

| | | |
|---|---|---|
| 2,734,184 | Rajchman | Feb. 7, 1956 |
| 2,803,812 | Rajchman | Aug. 20, 1957 |
| 2,869,112 | Hunter | Jan. 13, 1959 |
| 2,898,581 | Post | Aug. 4, 1959 |
| 2,923,923 | Raker | Feb. 2, 1960 |

OTHER REFERENCES

"The Transfluxor," by J. A. Rajchman, Proceedings of the IRE, vol. 44, Issue 3, pp. 321–332, March 1, 1956.